US008402181B2

(12) United States Patent
Brown

(10) Patent No.: US 8,402,181 B2
(45) Date of Patent: Mar. 19, 2013

(54) BIFURCATE ARBITER

(75) Inventor: David Brown, Carp (CA)

(73) Assignee: Integrated Device Technology, Inc., San Jose, CA (US)

( * ) Notice: Subject to any disclaimer, the term of this patent is extended or adjusted under 35 U.S.C. 154(b) by 706 days.

(21) Appl. No.: 12/046,590

(22) Filed: Mar. 12, 2008

(65) Prior Publication Data

US 2008/0225876 A1 Sep. 18, 2008

Related U.S. Application Data

(60) Provisional application No. 60/894,710, filed on Mar. 14, 2007.

(51) Int. Cl.
G06F 3/00 (2006.01)
G06F 15/173 (2006.01)
H04Q 11/00 (2006.01)

(52) U.S. Cl. ............ 710/36; 710/38; 709/212; 709/238; 370/370

(58) Field of Classification Search .................. None
See application file for complete search history.

(56) References Cited

U.S. PATENT DOCUMENTS

| 5,524,209 | A | * | 6/1996 | Parker et al. ..................... 714/36 |
| 5,987,549 | A | * | 11/1999 | Hagersten et al. ............ 710/107 |
| 6,359,884 | B1 | * | 3/2002 | Vincent .......................... 370/389 |
| 6,529,503 | B1 | * | 3/2003 | Chiang et al. ................. 370/363 |
| 6,687,796 | B1 | * | 2/2004 | Laine et al. .................... 711/149 |
| 6,747,971 | B1 | * | 6/2004 | Hughes et al. ................ 370/387 |
| 6,754,207 | B1 | * | 6/2004 | Hesse ............................ 370/388 |
| 6,856,622 | B1 | * | 2/2005 | Calamvokis et al. ......... 370/390 |
| 7,027,457 | B1 | * | 4/2006 | Chiussi et al. ................ 370/414 |
| 7,382,775 | B2 | * | 6/2008 | Hesse ............................ 370/386 |
| 7,505,422 | B1 | * | 3/2009 | Park .............................. 370/256 |
| 7,873,048 | B1 | * | 1/2011 | Kondapalli ................... 370/392 |
| 8,259,738 | B2 | * | 9/2012 | Sgouros et al. ............... 370/412 |
| 2001/0043612 | A1 | * | 11/2001 | Johnson et al. .............. 370/462 |
| 2002/0010735 | A1 | * | 1/2002 | McMillen et al. ............ 709/201 |
| 2002/0048280 | A1 | * | 4/2002 | Lee et al. ...................... 370/468 |
| 2002/0080828 | A1 | * | 6/2002 | Ofek et al. .................... 370/539 |
| 2002/0176428 | A1 | * | 11/2002 | Ornes et al. .................. 370/411 |
| 2002/0176431 | A1 | * | 11/2002 | Golla et al. ................... 370/412 |
| 2003/0128703 | A1 | * | 7/2003 | Zhao et al. .................... 370/392 |
| 2003/0221033 | A1 | * | 11/2003 | Kim .............................. 710/113 |
| 2004/0083326 | A1 | * | 4/2004 | Wang et al. ................... 710/317 |
| 2004/0085979 | A1 | * | 5/2004 | Lee et al. ...................... 370/412 |
| 2005/0135398 | A1 | * | 6/2005 | Muthukrishnan et al. .... 370/428 |
| 2006/0018329 | A1 | * | 1/2006 | Nielsen et al. ................ 370/401 |

(Continued)

*Primary Examiner* — Henry Tsai
*Assistant Examiner* — Michael Sun
(74) *Attorney, Agent, or Firm* — Bever, Hoffman & Harms

(57) ABSTRACT

An arbiter for a space switch comprising a two buffers, a media access controller having data outputs coupled to the two buffers, and two control outputs coupled to respective buffers for buffering input data at a clock rate one-half that of the input data and a switch fabric connected to the two buffers for matching buffer data throughput with switch data throughput, the arbiter comprising first and second schedulers, each scheduler includes a plurality of inputs for connection to the two buffers for receiving requests, a plurality of outputs for granting requests and a plurality of inter connections to each of the plurality of schedulers for informing them of grants and logic for logically grouping input ports associated with a bifurcate input port, logically grouping output ports associated with a bifurcate output port, establishing round robin pointers for each of two alternate clock ticks for tracking next allowable requests and on one clock tick allowing connection requests from input ports to output ports and accepting a connection request in dependence upon the grouping of the input and output ports and the round robin pointer. The arbiter can be generalized to an n-furcated switch having n-furcated ports where n is an integer greater than or equal to two.

18 Claims, 7 Drawing Sheets

U.S. PATENT DOCUMENTS

| | | | |
|---|---|---|---|
| 2006/0153069 A1* | 7/2006 | Lund et al. | 370/225 |
| 2006/0153179 A1* | 7/2006 | Ho et al. | 370/386 |
| 2006/0165111 A1* | 7/2006 | Varma | 370/428 |
| 2008/0008471 A1* | 1/2008 | Dress | 398/66 |
| 2009/0010152 A1* | 1/2009 | Ofek et al. | 370/216 |

* cited by examiner

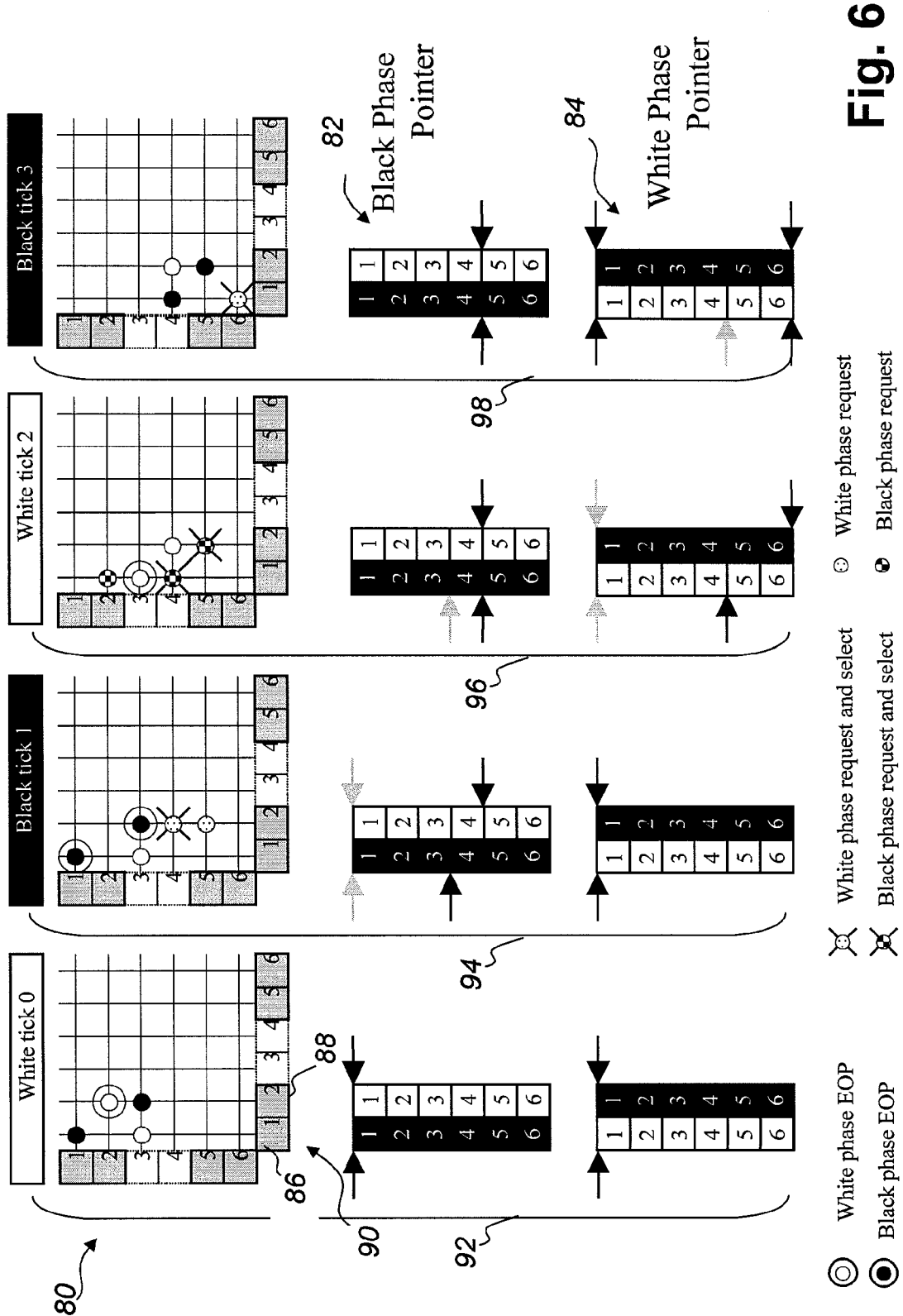

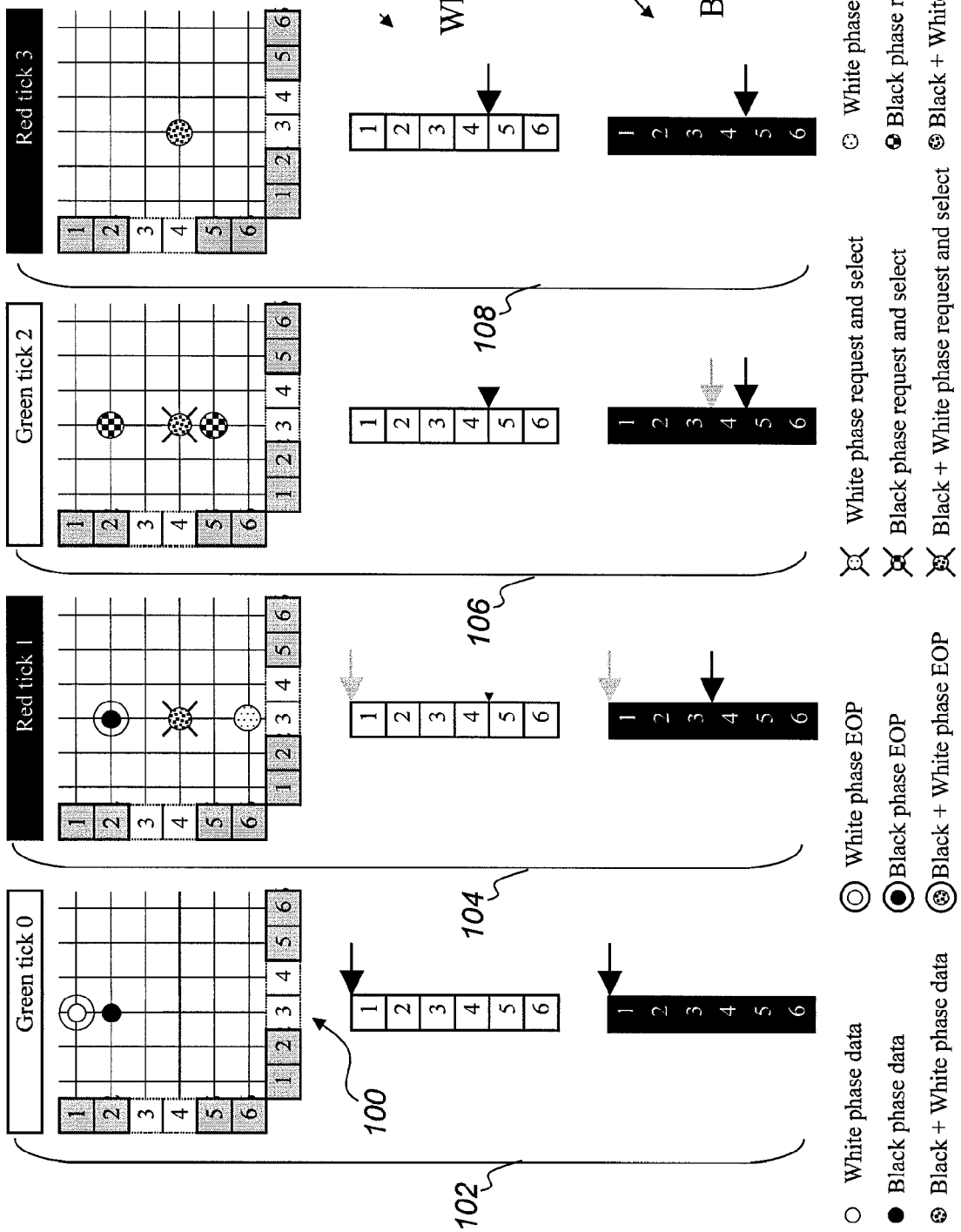

BIFURCATE ARBITER

CROSS-REFERENCE TO RELATED APPLICATIONS

A claim of priority is made to U.S. Provisional Application Ser. No. 60/894,710, entitled Bifuracate Arbiter, filed Mar. 14, 2007.

FIELD OF THE INVENTION

The present invention relates to arbiters and is particularly concerned with arbiters for bifurcate space switches.

BACKGROUND OF THE INVENTION

Peripheral Component Interconnect Express, PCIe 2.0 specifies 5.0 Gigbit/s symbol rate per lane. Multiple lanes can be used to fabricate larger port bandwidths. For example, x4 port would have an aggregate symbol rate of 20G, and a bit rate of 16G, 8b10b coding is used. A x8 port would have an aggregate symbol rate of 40G, and a bit rate of 32G. There are other serial interconnect protocols, for example serial rapid IO and Ethernet that have similar properties.

Referring to FIGS. 1 and 2, there are illustrated scheduler decision abstractions. The examples of FIGS. 1 and 2 are for scheduling a crossbar switch. The crossbar switch 10 includes input ports 12, output ports 14 and a switch fabric 16. Input ports 12 can be configures as x8 ports 18 and x4 ports 19. Output ports 14 can also be configured as x8 ports 20 and x4 ports 21. The spotted dots and checkered dots represent request connections on the white and black clock phase respectively. For crossbar scheduling only one dot per phase (color), per row and column. With FIFO queuing, only one request per row per phase (color). A logical port for a 1×8 port consists of two internal switch fabric (ISF) connections. Then dots 22 (spotted) represent requests for the white clock tick, while dots 24 (checkered) represent requests for the black clock tick. The dot 25 represents a request for both black and white clock ticks. The ellipses 26, 28 and 30 in the figures illustrate what a consistent decision would be. That is, in FIG. 1, ellipse 26 represents a x8 port to an x8 port connection, which preservers order and bandwidth of data switched. While ellipse 2 represents a x4 port to an x8 port connection, which also preservers order and bandwidth of data switched. Similarly, in FIG. 2, ellipse 30 represents a x8 port to a x4 port connection, which once again preservers order and bandwidth of data switched.

In order to simplify the ingress and egress queue management, it is desirable to make the scheduling decision such that the logical ports make consistent port selections.

SUMMARY OF THE INVENTION

An object of the present invention is to provide an improved bifurcate arbiter.

In accordance with an aspect of the present invention there is provided an arbiter for a space switch comprising a two buffers, a media access controller having data outputs coupled to the two buffers, and two control outputs coupled to respective buffers for buffering input data at a clock rate one-half that of the input data and a switch data through put, the arbiter comprising first and second schedulers, each scheduler includes a plurality of inputs for connection to the two buffers for receiving requests, a plurality of outputs for granting requests and a plurality of inter connections to each of the plurality of schedulers for informing them of grants and logic for logically grouping input ports associated with a bifurcate input port, logically grouping output ports associated with a bifurcate input port, logically grouping output ports associated with a bifurcate output port, establishing round robin pointers for each of two alternate clock ticks for tracking next allowable requests and on one clock tick allowing connection requests from input ports to output ports and accepting a connection request in dependence upon the grouping of the input and output ports and the round robin pointer.

In accordance with a further aspect of the present invention there is provided a method of switching for a space switch having bifurcate ports and ports, the method comprising the steps of logically grouping input ports associated with a bifurcate input port, logically grouping output ports associated with a bifurcate output port, establishing round robin pointers for each of two alternate clock ticks for tracking next allowable requests, on one clock tick allowing connection requests from input ports to output ports and accepting a connection request in dependence upon the grouping of the input and output ports and the round robin pointer.

The arbiter can be generalized to a furcated switch having $2^n$ ports where n is a positive integral power of 2.

By matching buffer throughput and switch fabric throughput a more effective use of buffers and fabric bandwidth is made.

BRIEF DESCRIPTION OF THE DRAWINGS

The present invention will be further understood from the following detailed description with reference to the drawings in which:

FIG. 6 illustrate switching for the bifurcate space switch of FIG. 3; and

FIG. 7 illustrate switching for the bifurcate space switch of FIG. 4.

DETAILED DESCRIPTION OF THE PREFERRED EMBODIMENT

Figure 1:
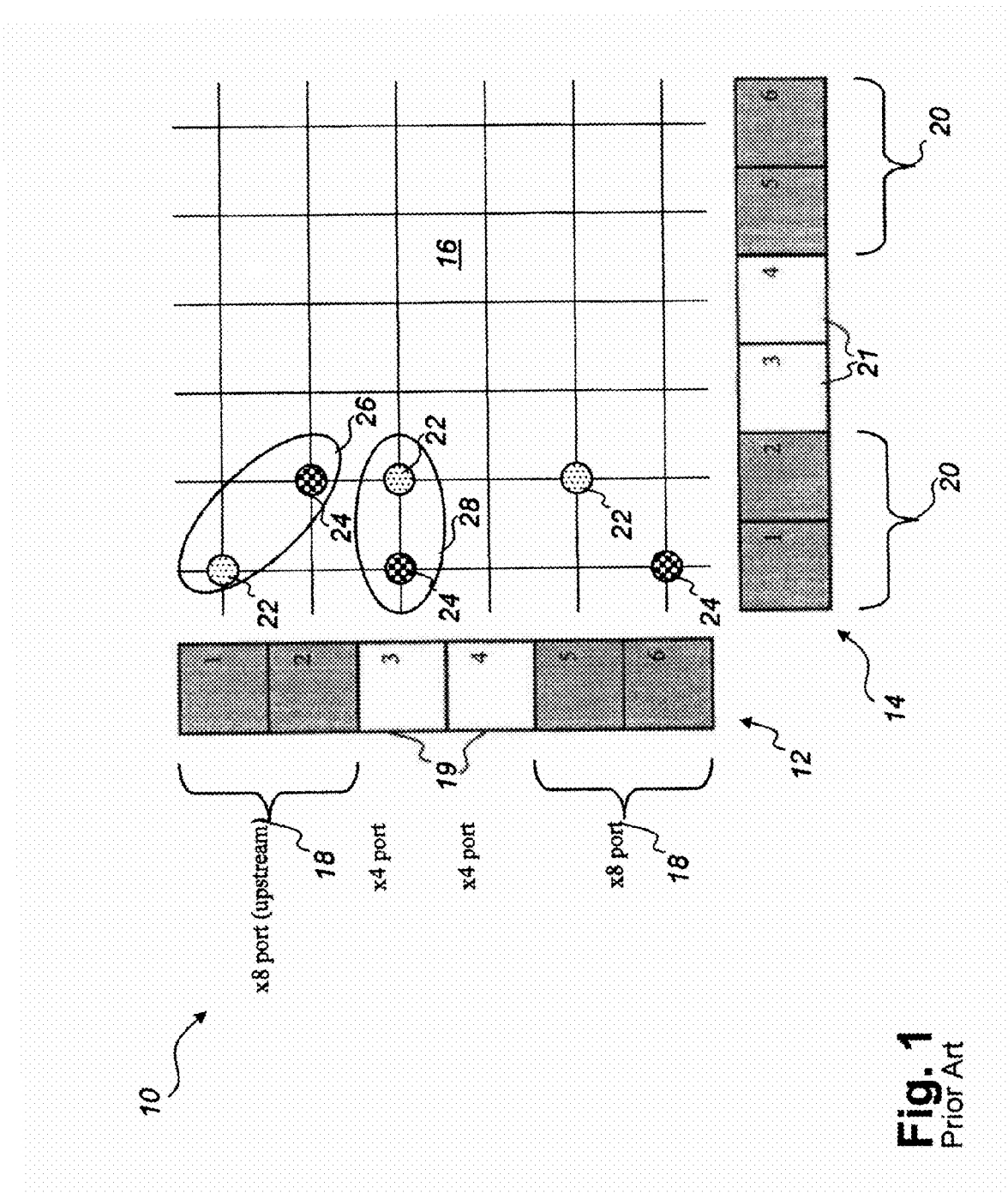
FIG. 1 illustrates a first scheduler decision abstraction.
Figure 2:
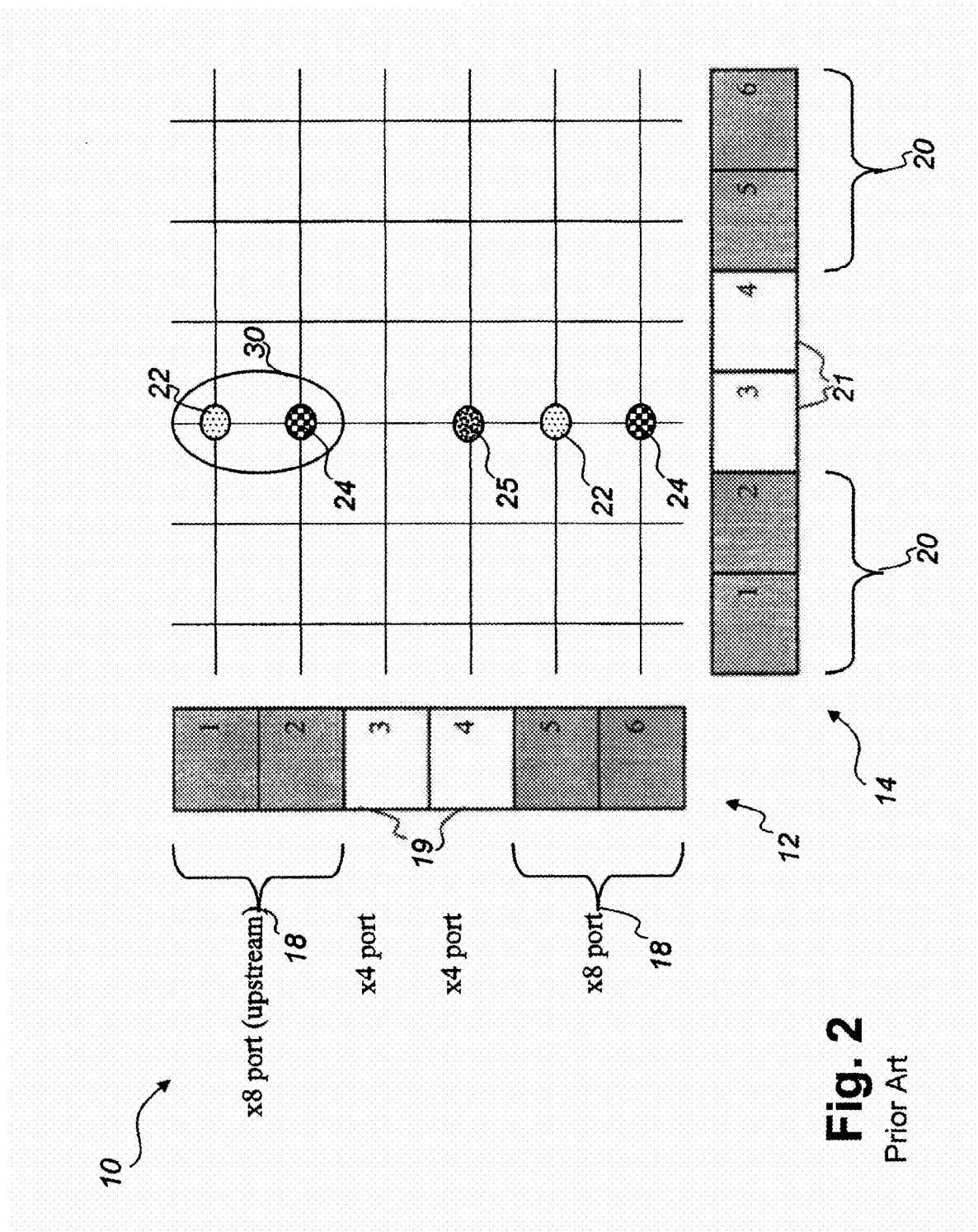
FIG. 2 illustrates a second scheduler decision abstraction.
Figure 3:
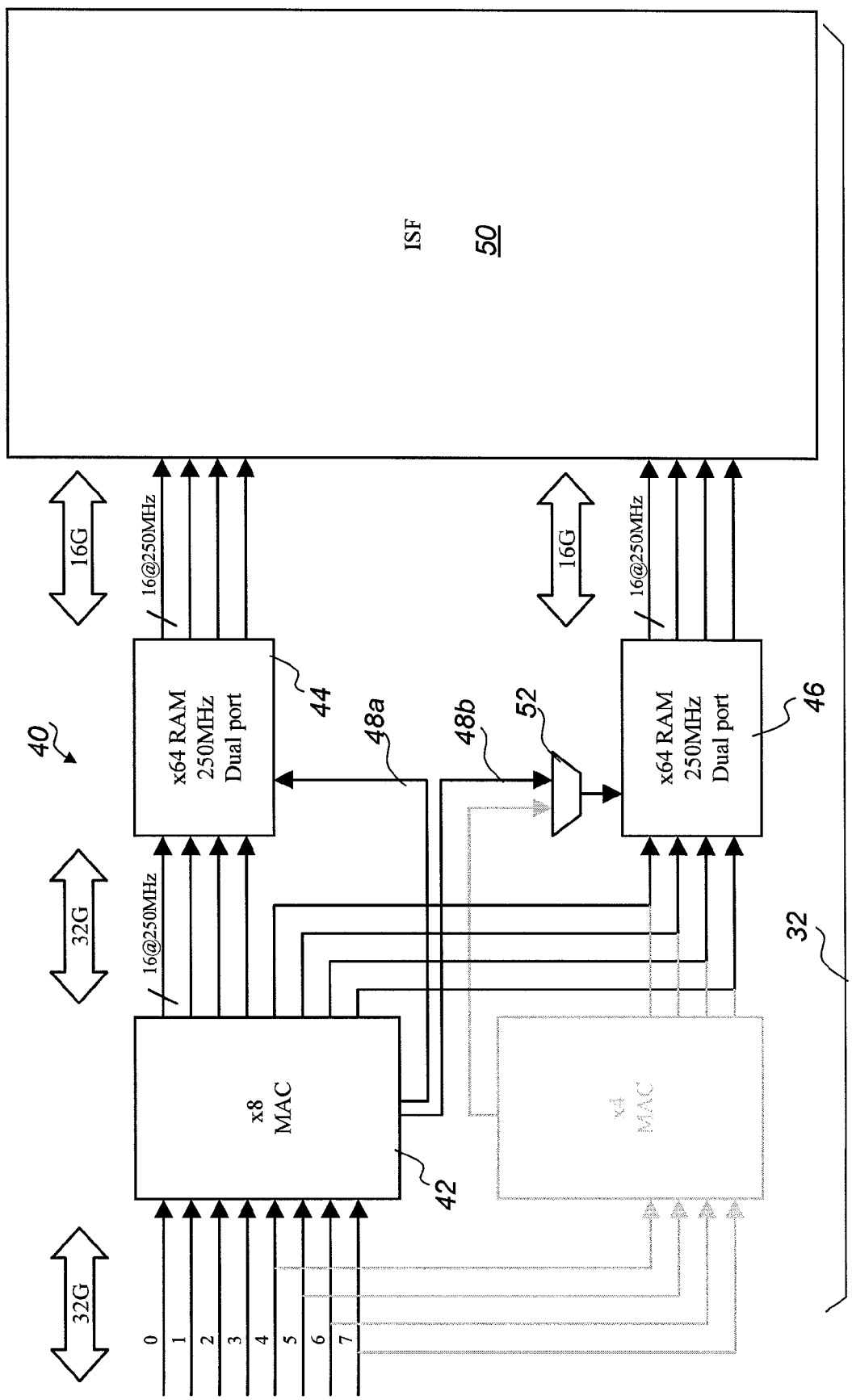
FIG. 3 illustrates a bifurcate space switch in accordance with a first configuration.

Referring to FIG. 3 there is illustrated a bifurcate space switch in accordance with a first configuration. The bifurcate space switch 32 includes a bifurcate buffer 40 and an ISF 50. The bifurcate buffer 40, shown configured as a 1×7 port, includes a media access controller (MAC) 42 receiving input from serializer/de-serializer (SERDES) (not shown in FIG. 3) and outputting four 16-bit wide lanes to each of x64 RAM 44 and 46, controlled by lines 48a and 48b, respectively. The control line 48b is coupled to the x64 RAM 46 via a MUX 52, which is used to change configuration of the bifurcate buffer 40.

In operation, the data is written into two-x64 250 MHz dual port RAM 44 and 46. The memory management of the MAC 42 generates different addresses for each bank. In the configuration shown, the 1×8port 40 is connected to the ISF 50 in such a way as to ensure that the external bandwidth and ISF bandwidth are the same, and that both buffers 44 and 46 are used.

Figure 4:
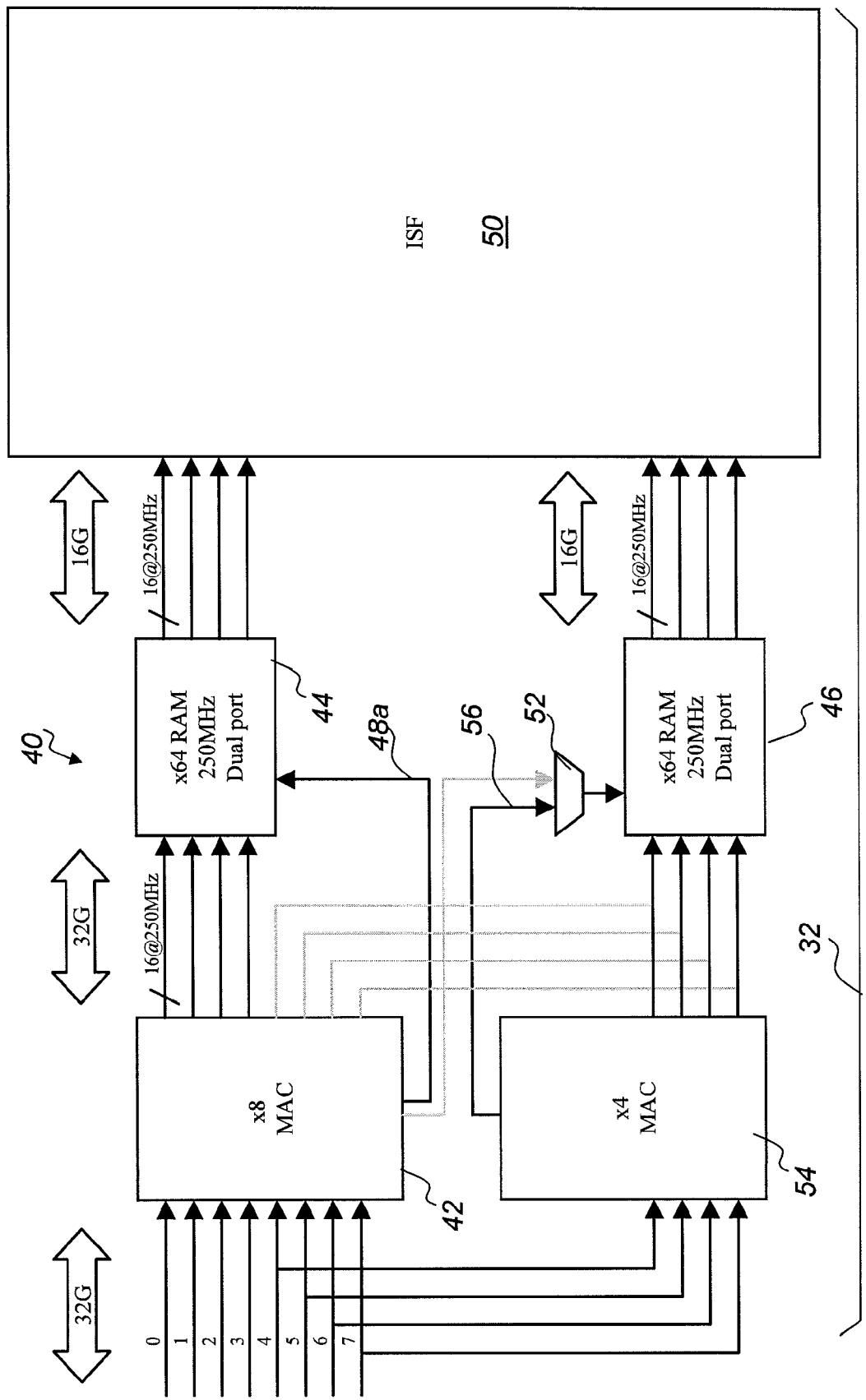
FIG. 4 illustrates a bifurcate space switch in accordance with a second configuration.

Referring to FIG. 4 there is illustrated a bifurcate space switch in accordance with a second configuration. In the 2×4 confirmation, the bifurcate space switch 32 includes a 2×4 bifurcate buffer 40 having a first media access controller (MAC) 42 receiving input from serializer/de-serializer (SER-DES) and outputting four 16-bit wide lanes to x64 RAM 44, controlled by line 48*a*. The 2×4 bifurcate buffer 40 also includes a second media access controller (MAC) 54 receiving input from the lower four serializer/de-serializer (SER-DES) and outputting four 16-bit wide lanes to x64 RAM 46, controlled by line 56. Hence, in this example the 1×8 port 40 bifurcates to 2×4 ports.

In operation, the upper x8 MAC 42 is configured to run in x4 mode. Here each buffer 44 and 46 is managed by its respective MAC 42 and 54. Again note that both buffers are used and the ISF bandwidth equals the port bandwidth.

Figure 5:
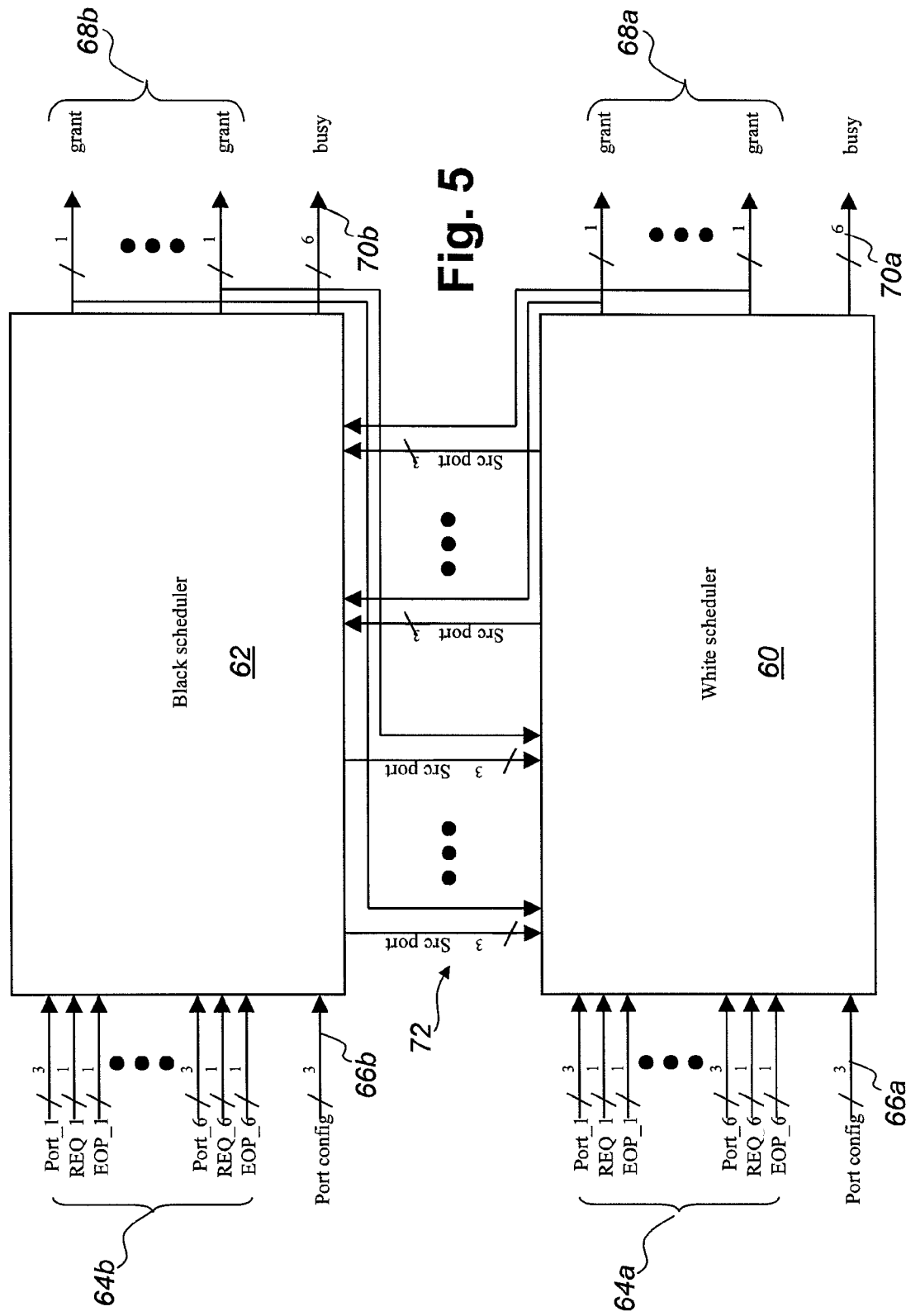
FIG. 5 illustrates a bifurcate arbiter in accordance with an embodiment of the present invention.

Referring to FIG. 5, a bifurcate arbiter in accordance with an embodiment of the present invention. The bifurcate arbiter includes two schedulers, a white scheduler 60 and a black scheduler 62, where white and black represent alternate clock ticks. Each scheduler includes a plurality of inputs 64 for requests from the ports, an input for port configuration 66 a plurality of outputs 68 for grants to the ports and a status output 70. A plurality of interconnects 72 between the two schedulers ensures that the grants are coordinated.

In operation, the two schedulers 60 and 62 work in a time-division multiplex (TDM) fashion. Each ingress port makes one request, via inputs 64, by holding REQ high for one tick. During this tick the desired output port is encoded on the Port bus. The busy[5:0] 70 indicates which egress ports are in use so that ingress ports will not request those ports. When the last tick of data occurs, the End Of Packet (EOP) is high, telling the scheduler to drop the busy bit for that port, so the ingress ports can request the egress port on the next clock tick.

Arbitration is accomplished on a per egress port basis. If multiple ingress ports request the same egress port, the ingress port is selected in a round robin fashion. In order to keep the scheduling decisions consistent, any time an egress port makes a port selection, grant high for one tick, this is passed to the other scheduler along with the ingress port selected via interconnects 72.

Referring to FIG. 6, there is illustrated a method of synchronizing the bifurcate arbiter of FIG. 5 for x8 ports. The method for keeping the schedulers 60 and 62 synchronized is now described herein below. Consider the x8 port 80 (ports 1 and 2) in FIG. 6. On the white tick only the white connections are active, the black are shown for reference only. The columns of numbers, [1,2,3,4,5,6], represent the round robin pointer for each port, and black and white clock phases, 82 and 84. Note for simplicity, only output to ports (1 and 2) 86 and 88 constituting a x8 port 90, is shown as the port under consideration.

Tick 0, White 92:
1. x8 port (1+2) 80 sending ½ bandwidth to x8 port (1+2) 90
2. x4 port (3) sending full bandwidth to x8 port (1+2) 90
3. the white port 2-port 2 connection indicates EOP Tick 1, Black 94:
1. the black port 1-port 1 connection indicates EOP
2. the black port 3-port 2 connection indicates EOP
3. the white port 4-port 2 connection is requested and selected (port 4 is closest to pointer)
4. the white round robin pointer for port 2 advances to port 5 (because port 4 was selected)
5. the black round robin pointer for port 2 advances to port 4 (white port 4 was just selected)
6. the white port 5-port 2 connection is requested and not selected Tick 2, White 96:
1. the white 3-1 connection indicates EOP
2. the black 4-1 connection is requested and is selected (port 4 is closest to pointer)
3. the black round robin pointer for port 1 advances to port 5 (port 4 was just selected)
4. the black 2-1 connection is requested and not selected
5. the black 5-2 connection is requested and is selected (port 4 is closest to pointer)
6. the black round robin pointer for port 2 advances to port 5 (port 4 was just selected)

Tick 3, Black 98:
1. the white 6-1 connection is requested and is selected (only request)
2. the white round robin pointer for port 1 advances to port 1 (port 6 was just selected)

Note that for x8 ports pointer advancement, the group is treated as one location.

Referring to FIG. 7, there is illustrated a method of synchronizing the bifurcate arbiter of FIG. 5 for x4 ports. Note for simplicity, only output to port 3 constituting a x4 port 100, is shown as the port under consideration. As in FIG. 6, on the white tick only the white connections are active, the black are shown for reference only. The columns of numbers, [1,2,3,4,5,6], represent the round robin pointer for each port, and black and white clock phases, 110 and 112.

Packets switching to a x4 port is now described.

Tick 0, White 100:
1. x8 port (1+2) 80 sending ½ bandwidth to x4 port (3) 100
2. the white port 1-port 3 connection indicates EOP Tick 1, Black 104:
1. the black port 2-port 3 connection indicates EOP
2. the black port 4-port 3 connection is requested and is selected (port 4 is closest to pointer)
3. the black round robin pointer for port 3 advances to port 5 (because port 4 was selected)
4. the white round robin pointer for port 3 advances to port 4 (because port 4 was just selected)
5. the white port 6-port 3 connection is requested and not selected Tick 2, White 106:
1. the white port 4-port 3 connection is requested and is selected (port 4 is closest to pointer)
2. the black round robin pointer for port 1 advances to port 5 (because port 4 was just selected)
3. the black port 2-port 3 connection is requested and not selected the black port 5-port 3 connection is requested and not selected Tick 3, Black 108:
1. data flows port 4-port 3

Numerous modifications, variations and adaptations may be made to the particular embodiments described above without departing from the scope patent disclosure, which is defined in the claims.

What is claimed is:

1. An arbiter for a switch having a plurality of ingress ports and a plurality of egress ports comprising:
   a first scheduler coupled to receive egress port requests from each of the ingress ports, and in response, grant connections that extend completely between the ingress ports and the egress ports for a first set of clock ticks;
   a second scheduler coupled to receive egress port requests from each of the ingress ports, and in response, grant connections that extend completely between the ingress ports and the egress ports for a second set of clock ticks, wherein the first set of clock ticks alternate with the second set of clock ticks; and a first set of interconnects that transmit a first set of signals identifying granted connections between the ingress ports and the egress ports from the first scheduler to the second scheduler; and a second set of interconnects that transmit a second set of signals identifying granted connections between the ingress ports and the egress ports from the second scheduler to the first scheduler.

2. The arbiter of claim 1, further comprising a first status output bus that transmits signals identifying which of the egress ports have been granted connections by the first scheduler, wherein the first status output bus is coupled to first scheduler and the ingress ports; and a second status output bus that transmits signals identifying which of the egress ports have been granted connections by the second scheduler, wherein the second status output bus is coupled to the second scheduler and the ingress ports.

3. The arbiter of claim 1, wherein each of the egress port requests provided by the ingress ports includes:

a port request signal from the associated ingress port; and an egress port value that identifies which one of the egress ports is requested for a connection by the associated ingress port.

4. The arbiter of claim 1, wherein the first scheduler is further coupled to receive an end-of-packet signal from each of the ingress ports, and in response, terminate connections between the ingress ports and the egress ports for the first set of clock ticks, and wherein the second scheduler is further coupled to receive an end-of-packet signal from each of the ingress ports, and in response, terminate connections between the ingress ports and the egress ports for the second set of clock ticks.

5. The arbiter of claim 1, wherein the first set of signals comprise:

a grant signal associated with each egress port, wherein each grant signal is activated to indicate that the associated egress port has a granted connection to one of the ingress ports for the first set of clock ticks; and a source port value associated with each egress port, wherein each source port value identifies which one of the ingress ports has a granted connection to the associated egress port for the first set of clock ticks.

6. The arbiter of claim 5, wherein the second set of signals comprise:

a second grant signal associated with each egress port, wherein each second grant signal is activated to indicate that the associated egress port has a granted connection to one of the ingress ports for the second set of clock ticks; and a second source port value associated with each egress port, wherein each second source port value identifies which one of the ingress ports has a granted connection to the associated egress port for the second set of clock ticks.

7. The arbiter of claim 6, wherein the first scheduler comprises first means for arbitrating the received egress port requests, wherein the first means for arbitrating operate in response to each second grant signal and each second source port value, and wherein the second scheduler comprises second means for arbitrating the received egress port requests, wherein the second means for arbitrating operate in response to each grant signal and each source port value.

8. The arbiter of claim 1, further comprising means for arbitrating multiple egress port requests that specify the same egress port, wherein the means for arbitrating select an ingress port to be granted connection to the egress port in a round robin fashion.

9. An method of scheduling connections for a switch having a plurality of ingress ports and a plurality of egress ports, the method comprising:

transmitting egress port requests from the ingress ports to a first scheduler and a second scheduler, wherein each egress port request requests a connection between the ingress port transmitting the request and one of the egress ports;

granting connections that extend completely between the ingress ports and the egress ports in response to the egress port requests within the first scheduler for a first set of clock ticks;

granting connections that extend completely between the ingress ports and the egress ports in response to the egress port requests within the second scheduler for a second set of clock ticks, wherein the first set of clock ticks alternate with the second set of clock ticks;

transmitting a first set of signals identifying connections granted between the ingress ports and the egress ports by the first scheduler to the second scheduler; and transmitting a second set of signals identifying connections granted between the ingress ports and the egress ports by the second scheduler to the first scheduler.

10. The method of claim 9, further comprising:

transmitting a first set of status signals from the first scheduler to the ingress ports, wherein the first set of status signals identify which of the egress ports have been granted connections by the first scheduler; and transmitting a second set of status signals from the second scheduler to the ingress ports, wherein the second set of status signals identify which of the egress ports have been granted connections by the second scheduler.

11. The method of claim 9, wherein an ingress port transmits an egress port request by:

activating a port request signal that identifies the ingress port; and transmitting an egress port value that identifies which one of the egress ports is requested for connection to the ingress port.

12. The method of claim 9, further comprising:

transmitting end-of-packet signals from the ingress ports to the first and second schedulers, wherein each of the end-of-packet signals indicates a last tick of data for the associated ingress port; and terminating connections between the ingress ports and the egress ports within the first and second schedulers in response to the end-of-packet signals.

13. The method of claim 9, further comprising:

transmitting end-of-packet signals from the ingress ports to the first scheduler, wherein each of the end-of-packet signals indicates a last tick of data for the associated ingress port; and terminating connections between the ingress ports and the egress ports for the first set of clock ticks in response to end-of-packet signals received by the first scheduler.

14. The method of claim 13, further comprising:

transmitting end-of-packet signals from the ingress ports to the second scheduler; and terminating connections between the ingress ports and the egress ports for the second set of clock ticks in response to end-of-packet signals received by the second scheduler.

15. The method of claim 9, wherein the first set of signals comprise:

a grant signal associated with each egress port, wherein each grant signal is activated to indicate that the associated egress port has a granted connection to one of the ingress ports for the first set of clock ticks; and a source port value associated with each egress port, wherein each source port value identifies which one of the ingress ports has a granted connection to the associated egress port for the first set of clock ticks.

16. The method of claim 15, wherein the second set of signals comprise:

a second grant signal associated with each egress port, wherein each second grant signal is activated to indicate that the associated egress port has a granted connection to one of the ingress ports for the second set of clock ticks; and a second source port value associated with each egress port, wherein each second source port value identifies which one of the ingress ports has a granted connection to the associated egress port for the second set of clock ticks.

17. The method of claim 16, further comprising:

arbitrating egress port requests received by the first scheduler in response to each second grant signal and each second source port value; and arbitrating egress port requests received by the second scheduler in response to each grant signal and each source port value.

18. The method of claim 9, further comprising arbitrating multiple egress port requests that specify the same egress port, by selecting an ingress port to be granted connection to the egress port in a round robin fashion.

* * * * *